(12) United States Patent
Ellis

(10) Patent No.: US 8,949,689 B2
(45) Date of Patent: Feb. 3, 2015

(54) STORAGE CONTROL SYSTEM WITH DATA MANAGEMENT MECHANISM AND METHOD OF OPERATION THEREOF

(75) Inventor: Robert W. Ellis, Phoenix, AZ (US)

(73) Assignee: Smart Storage Systems, Inc., Chandler, AZ (US)

( * ) Notice: Subject to any disclaimer, the term of this patent is extended or adjusted under 35 U.S.C. 154(b) by 0 days.

(21) Appl. No.: 13/493,949

(22) Filed: Jun. 11, 2012

(65) Prior Publication Data

US 2013/0332796 A1   Dec. 12, 2013

(51) Int. Cl.
G11C 29/44 (2006.01)
G11C 29/54 (2006.01)

(52) U.S. Cl.
USPC .......................... 714/763; 714/718

(58) Field of Classification Search
None
See application file for complete search history.

(56) References Cited

U.S. PATENT DOCUMENTS

| | | | |
|---|---|---|---|
| 4,048,481 A * | 9/1977 | Bailey et al. | 714/41 |
| 4,839,587 A | 6/1989 | Flatley et al. | |
| 5,311,395 A | 5/1994 | McGaha et al. | |
| 5,479,638 A | 12/1995 | Assar et al. | |
| 5,930,504 A | 7/1999 | Gabel | |
| 5,949,785 A | 9/1999 | Beasley | |
| 5,963,983 A | 10/1999 | Sakakura et al. | |
| 6,091,652 A | 7/2000 | Haehn et al. | |
| 6,275,436 B1 | 8/2001 | Tobita et al. | |
| 6,345,367 B1 | 2/2002 | Sinclair | |
| 6,356,447 B2 | 3/2002 | Scafidi | |
| 6,381,670 B1 | 4/2002 | Lee et al. | |
| 6,412,080 B1 | 6/2002 | Fleming et al. | |
| 6,529,997 B1 | 3/2003 | Debiez et al. | |
| 6,552,581 B1 | 4/2003 | Gabara | |
| 6,587,915 B1 | 7/2003 | Kim | |
| 6,618,249 B2 | 9/2003 | Fairchild | |
| 6,728,913 B1 | 4/2004 | Parker | |
| 6,763,424 B2 | 7/2004 | Conley | |
| 6,775,792 B2 | 8/2004 | Ulrich et al. | |
| 6,778,387 B2 | 8/2004 | Fairchild | |
| 6,850,443 B2 | 2/2005 | Lofgren et al. | |
| 6,854,070 B2 | 2/2005 | Johnson et al. | |
| 6,903,972 B2 | 6/2005 | Lasser et al. | |
| 6,906,961 B2 | 6/2005 | Eggleston et al. | |
| 6,975,028 B1 | 12/2005 | Wayburn et al. | |
| 7,082,495 B2 | 7/2006 | DeWhitt et al. | |

(Continued)

FOREIGN PATENT DOCUMENTS

EP   1 990 921 A2   11/2008
WO   WO 2009/042298   4/2009

OTHER PUBLICATIONS

Ulinktech, "ATA Command Table (in Alphabetic Order)," Feb. 6, 2011, https://web.archive.org/web/20110206060820/http://www.ulinktech.com/downloads/AT, 6 pages.

(Continued)

*Primary Examiner* — Ajay Bhatia
*Assistant Examiner* — Dipakkumar Gandhi
(74) *Attorney, Agent, or Firm* — Morgan, Lewis & Bockius LLP

(57) ABSTRACT

A method of operation of a storage control system includes: generating encoded data having a proportional data distribution for writing to a memory device; identifying a marginal block when an erase block is read from the memory device; and generating a marginal tag for the marginal block, the marginal tag having a non-proportional data distribution different from the proportional data distribution.

20 Claims, 5 Drawing Sheets

(56) References Cited

U.S. PATENT DOCUMENTS

| | | |
|---|---|---|
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,979,614 B1 | 7/2011 | Yang |
| 8,001,135 B2 | 8/2011 | Perlmutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,254,172 B1 | 8/2012 | Kan |
| 8,259,506 B1 | 9/2012 | Sommer et al. |
| 8,289,801 B2 | 10/2012 | Smith et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,407,409 B2 | 3/2013 | Kawaguchi |
| 8,464,106 B2 | 6/2013 | Filor et al. |
| 8,612,804 B1 | 12/2013 | Kang et al. |
| 2002/0159285 A1* | 10/2002 | Morley et al. ................ 365/97 |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2006/0020745 A1 | 1/2006 | Conley et al. |
| 2006/0136682 A1 | 6/2006 | Haridas et al. |
| 2006/0143365 A1* | 6/2006 | Kikuchi ..................... 711/103 |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0061511 A1 | 3/2007 | Faber |
| 2007/0083779 A1 | 4/2007 | Misaka et al. |
| 2007/0234004 A1 | 10/2007 | Oshima et al. |
| 2007/0260811 A1 | 11/2007 | Merry, Jr. et al. |
| 2007/0276973 A1 | 11/2007 | Tan et al. |
| 2008/0046630 A1 | 2/2008 | Lasser |
| 2008/0052446 A1 | 2/2008 | Lasser et al. |
| 2008/0082736 A1* | 4/2008 | Chow et al. ................ 711/103 |
| 2008/0183918 A1 | 7/2008 | Dhokia et al. |
| 2008/0313505 A1 | 12/2008 | Lee et al. |
| 2009/0019321 A1 | 1/2009 | Radke |
| 2009/0083587 A1 | 3/2009 | Ng et al. |
| 2009/0089485 A1 | 4/2009 | Yeh |
| 2009/0138654 A1 | 5/2009 | Sutardja |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0172262 A1 | 7/2009 | Olbrich et al. |
| 2009/0228761 A1 | 9/2009 | Perlmutter et al. |
| 2009/0259819 A1 | 10/2009 | Chen et al. |
| 2009/0259896 A1* | 10/2009 | Hsu et al. ..................... 714/723 |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0138592 A1 | 6/2010 | Cheon |
| 2010/0169541 A1 | 7/2010 | Freikorn |
| 2010/0174845 A1 | 7/2010 | Gorobets et al. |
| 2010/0217898 A1 | 8/2010 | Priborsky et al. |
| 2010/0217915 A1 | 8/2010 | O'Connor et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0332726 A1 | 12/2010 | Wang |
| 2011/0055468 A1 | 3/2011 | Gonzalez et al. |
| 2011/0066788 A1 | 3/2011 | Eleftheriou et al. |
| 2011/0131365 A1 | 6/2011 | Zhang et al. |
| 2011/0131447 A1 | 6/2011 | Prakash et al. |
| 2011/0132000 A1 | 6/2011 | Deane et al. |
| 2011/0145473 A1 | 6/2011 | Maheshwari |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0238892 A1 | 9/2011 | Tsai et al. |
| 2011/0320687 A1 | 12/2011 | Belluomini et al. |
| 2012/0047320 A1 | 2/2012 | Yoo et al. |
| 2012/0047409 A1 | 2/2012 | Post et al. |
| 2012/0124046 A1 | 5/2012 | Provenzano |
| 2012/0124273 A1 | 5/2012 | Goss et al. |
| 2012/0151260 A1 | 6/2012 | Zimmermann et al. |
| 2012/0216085 A1 | 8/2012 | Weingarten et al. |
| 2012/0239858 A1 | 9/2012 | Melik-Martirosian |
| 2012/0266048 A1 | 10/2012 | Chung et al. |
| 2012/0331207 A1 | 12/2012 | Lassa et al. |
| 2013/0007380 A1 | 1/2013 | Seekins et al. |
| 2013/0007543 A1 | 1/2013 | Goss et al. |
| 2013/0073788 A1 | 3/2013 | Post et al. |
| 2013/0080691 A1 | 3/2013 | Weingarten et al. |
| 2013/0100600 A1 | 4/2013 | Yin et al. |
| 2013/0124792 A1 | 5/2013 | Melik-Martirosian et al. |
| 2014/0108891 A1 | 4/2014 | Strasser et al. |

OTHER PUBLICATIONS

International Search Report and Written Opinion dated May 14, 2014, received in International Patent Application No. PCT/US2014/017168, which corresponds to U.S. Appl. No. 14/076,115, 6 pages (Fitzpatrick).

International Search Report and Written Opinion dated May 14, 2014, received in International Patent Application No. PCT/US2014/017169, which corresponds to U.S. Appl. No. 14/076,148, 6 pages (Fitzpatrick).

International Search Report dated Mar. 25, 2014, received in International Patent Application No. PCT/US2013/072400, which corresponds to U.S. Appl. No. 13/690,337, 3 pages (Ellis).

International Search Report and Written Opinion dated Jun. 12, 2014, received in PCT/US2014/018972, which corresponds to U.S. Appl. No. 13/779,352, 12 pages (Schmier).

Invitation to Pay Additional Fees dated Jul. 25, 2014, received in International Patent Application No. PCT/US2014/021290, which corresponds to U.S. Appl. No. 13/791,797, 8 pages (Dean).

(56) References Cited

OTHER PUBLICATIONS

International Search Report and Written Opinion dated Jul. 31, 2014, received in International Patent Application No. PCT/US2014/031465, which corresponds to U.S. Appl. No. 13/851,928, 13 pages (Ellis).

International Search Report and Written Opinion dated Jul. 31, 2014, received in International Patent Application No. PCT/US2014/033876, which corresponds to U.S. Appl. No. 13/861,326, 9 pages (Fitzpatrick).

International Search Report for PCT Application No. PCT/US2013/045282 dated Dec. 20, 2013.

Cooke, "Introduction to Flash Memory (T1A)," Flash Memory Summit, Aug. 22, 2008, Micron Technology, Inc., 102 pages.

Gal et al., "Algorithms and Data Structures for Flash Memories," ACM Computing Surveys, Jun. 2005, vol. 37, No. 2, 30 pages.

O'Brien, "SMART Storage Systems Optimus SAS Enterprises SSD Review," SMART Storage Systems, Oct. 9, 2012, 44 pages.

Spanjer, "Flash Management—Why and How?" Smart Modular Technologies, Nov. 2009, http://www.scantec.de/fileadmin/pdf/Smart_Modular/Flash-Management.pdf, 14 pages.

IBM Corporation, Systems Management Controlling System Shutdown Using a Power-Handling Program, Version 5, Release 4, 9th Edition, pp. 1-21, Feb. 2006.

Texas Instruments, Power Management IC for Digital Set Top Boxes, SLVSA10A, pp. 1-22, Sep. 2009.

* cited by examiner

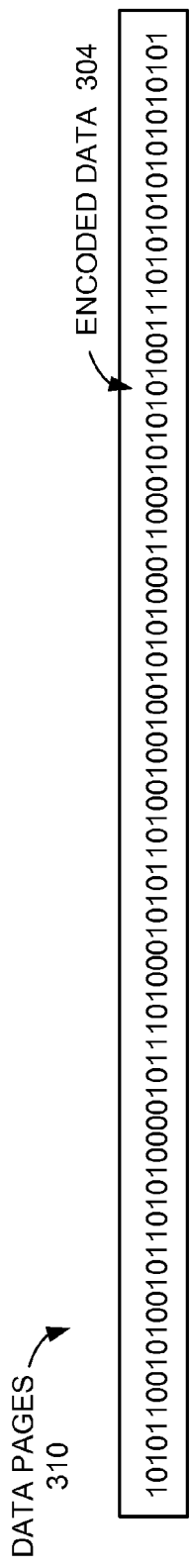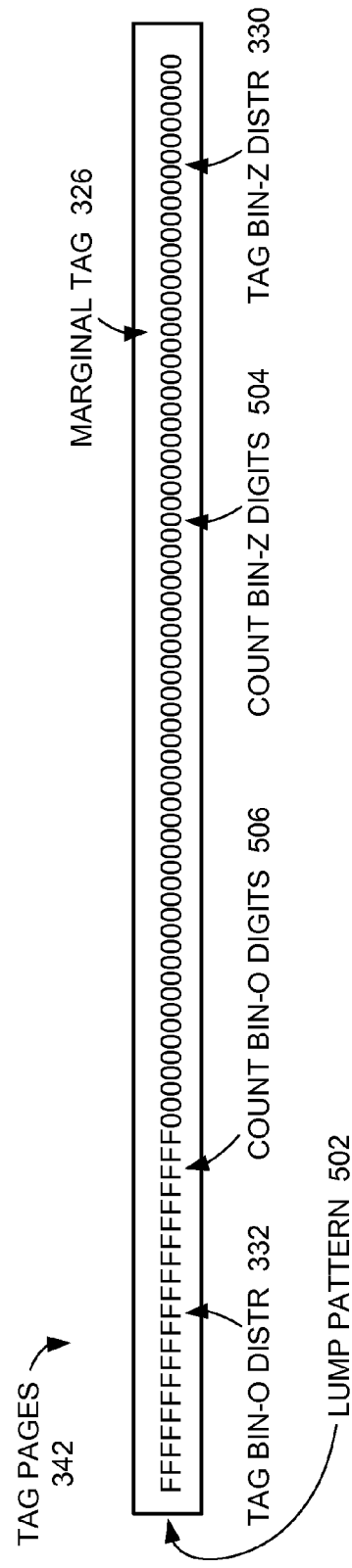

STORAGE CONTROL SYSTEM WITH DATA MANAGEMENT MECHANISM AND METHOD OF OPERATION THEREOF

TECHNICAL FIELD

The present invention relates generally to a storage control system and more particularly to a system for data management.

BACKGROUND ART

Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

An information system is generally equipped with a data storage system using a hard disk drive (HDD) as a storage device. The data storage system is accessed from a plurality of higher-level devices (for example, hosts) via a storage area network (SAN). Storage control in the data storage system can be implemented according to a RAID (Redundant Array of Independent (or Inexpensive)) technology. As a result, a highly reliable information system can be realized.

The data storage system can include a flash memory that is installed instead of or in addition to an HDD and data that will be read out or written into a higher-level device are stored in the flash memory. It can be anticipated that the data storage system having the same storage capacity as a storage system based on HDD will be realized by providing a large number of flash memories. As the capacity and a number of the flash memories increase, data stored in the flash memories must be properly managed to order to improve reliability of the data storage system.

Thus, a need still remains for better data management. In view of the increasing demand for improved data management, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a storage control system, including: generating encoded data having a proportional data distribution for writing to a memory device; identifying a marginal block when an erase block is read from the memory device; and generating a marginal tag for the marginal block, the marginal tag having a non-proportional data distribution different from the proportional data distribution.

The present invention provides a storage control system, including: a data generation module for generating encoded data having a proportional data distribution for writing to a memory device; a block identification module for identifying a marginal block when an erase block is read from the memory device; and a tag generation module for generating a marginal tag for the marginal block, the marginal tag having a non-proportional data distribution different from the proportional data distribution.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 4 is an exemplary diagram of a portion of one of the data pages.

FIG. 5 is a first exemplary diagram of the marginal tag for a portion of the marginal blocks of FIG. 3.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Figure 1:
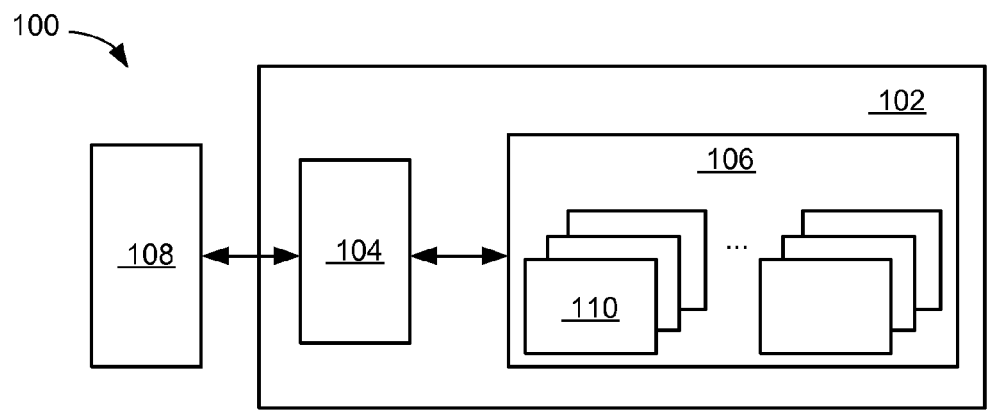
FIG. 1 is a storage control system with data management mechanism in an embodiment of the present invention.

Referring now to FIG. 1, therein is shown a storage control system 100 with data management mechanism in an embodiment of the present invention. The storage control system 100 can include a memory sub-system 102 having a memory controller 104 and a memory array 106. The memory sub-system 102 can include a solid-state disk (SSD). The storage control system 100 can include a host system 108 communicating with the memory sub-system 102.

The memory controller 104 provides data control and management of the memory array 106. The memory controller 104 interfaces with the host system 108 and controls the memory array 106 to transfer data between the host system 108 and the memory array 106.

The memory array 106 can include an array of memory devices 110. The memory array 106 can include pages of data or information. The host system 108 can request the memory controller 104 for reading, writing, and deleting data from or to a logical address space of a storage device including the memory array 106. For example, the memory devices 110 can represent a non-volatile memory including a flash memory device or a reprogrammable storage device. As a specific example, the memory devices 110 can represent a non-volatile memory including a NAND type device, a flash memory, and a multi-level cell (MLC) memory.

Figure 2:
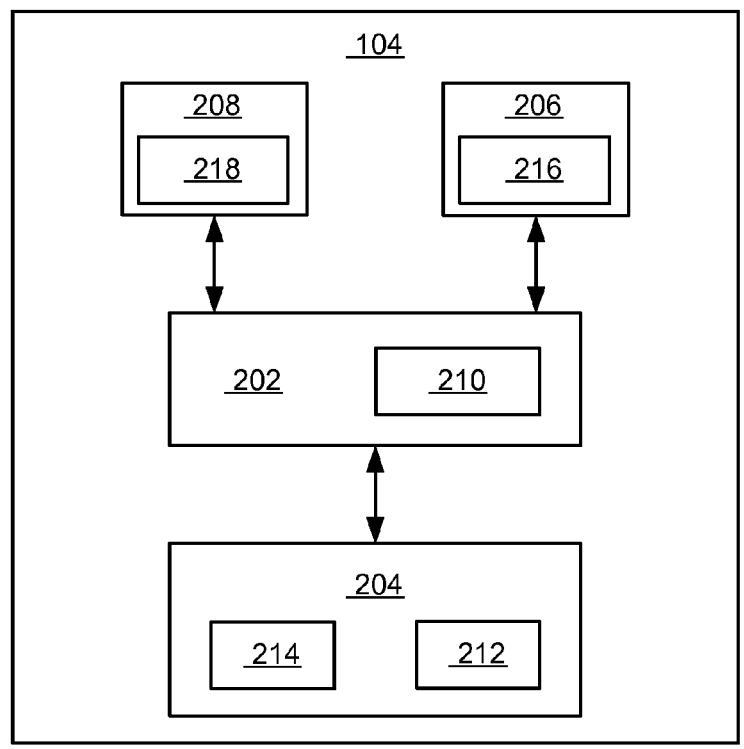
FIG. 2 is an exemplary hardware block diagram of the memory controller.

Referring now to FIG. 2, therein is shown an exemplary hardware block diagram of the memory controller 104. The memory controller 104 can include a control unit 202, a storage unit 204, a memory interface unit 206, and a host interface unit 208. The control unit 202 can include a control interface 210. The control unit 202 can execute software 212 stored in the storage unit 204 to provide the intelligence of the memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The control interface 210 can be used for communication between the control unit 202 and other functional units in the memory controller 104. The control interface 210 can also be used for communication that is external to the memory controller 104.

The control interface 210 can receive information from the other functional units or from external sources, or can transmit information to the other functional units or to external destinations. The external sources and the external destinations refer to sources and destinations external to the memory controller 104.

The control interface 210 can be implemented in different ways and can include different implementations depending on which functional units or external units are being interfaced with the control interface 210. For example, the control interface 210 can be implemented with dedicated hardware including an application-specific integrated circuit (ASIC), configurable hardware including a Field programmable Gate Array (FPGA), a discrete electronic hardware, or a combination thereof.

The storage unit 204 can include hardware for storing the software 212 including control firmware. The storage unit 204 can include a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the memory controller 104. The storage interface 214 can receive information from the other functional units or from external sources, or can transmit information to the other functional units or to external destinations. The external sources and the external destinations refer to sources and destinations external to the memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the memory controller 104. For example, the memory interface unit 206 can permit the memory controller 104 to communicate with the memory array 106 of FIG. 1.

The memory interface unit 206 can include a memory interface 216. The memory interface 216 can be used for communication between the memory interface unit 206 and other functional units in the memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 108 of FIG. 1 to interface and interact with the memory controller 104. The host interface unit 208 can include a host interface 218 to provide communication mechanism between the host interface unit 208 and the host system 108.

The control unit 202 can operate the host interface unit 208 to send control or status information generated by the memory controller 104 to the host system 108. The control unit 202 can also execute the software 212 for the other functions of the memory controller 104. The control unit 202 can further execute the software 212 for interaction with the memory array 106 via the memory interface unit 206.

The functional units in the memory controller 104 can work individually and independently of the other functional units. For illustrative purposes, the memory controller 104 is described by operation of the memory controller 104 with the host system 108 and the memory array 106. It is understood that the memory controller 104, the host system 108, and the memory array 106 can operate any of the modules and functions of the memory controller 104.

Figure 3:
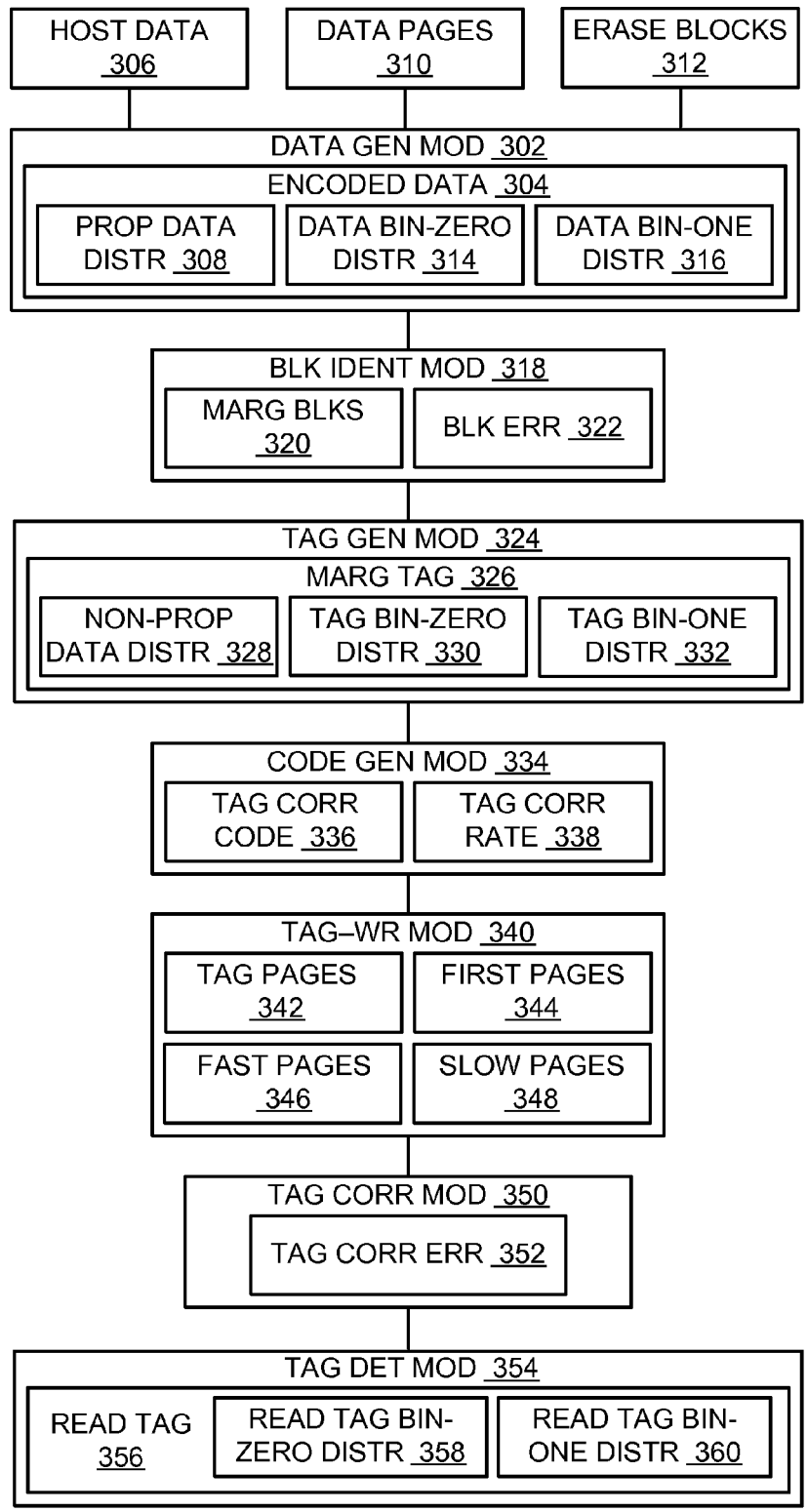
FIG. 3 is a control flow of the memory controller of FIG. 1.

Referring now to FIG. 3, therein is shown a control flow of the memory controller 104 of FIG. 1. The memory controller 104 can perform tagging of marginal portions of the memory devices 110 of FIG. 1.

Reliability of a solid-state disk (SSD) can degrade as the memory devices 110 in the SSD are used. During normal operations, erase blocks 312 can become marginal or not usable for a number of reasons due to failure conditions. For example, the failure conditions can include an oxide layer does not hold charge in multiple cells, an uncorrectable ECC error, and an excessive bit dropout due to read disturbs. For example, the failure conditions can be determined based on age, bit error rate (BER), write cycle counts, program/erase (P/E) cycles, time to program the memory devices 110, or time to erase the erase blocks 312.

The memory sub-system 102 of FIG. 1 having the memory devices 110 can represent a solid-state disk (SSD) having flash memory devices. The memory devices 110 can represent multi-level cell (MLC) NAND flash memory devices, which can include characteristics that differ from single-level cell (SLC) NAND flash memory devices. For example, the characteristics that differ can include density, read speed, block size, endurance, data retention, page-to-page data dependence, page-to-page bit error rate (BER).

The memory devices 110 can be operated with steps to allow them to have correct endurance and retention properties. One of the steps can include generating data to be stored in the memory devices 110 are uncorrelated from page to page within an erase block. The term "uncorrelated" refers to data that are randomized and not related to each other.

The uncorrelated data can be generated by performing a scrambling process or an encryption process on incoming data from the host system 108 of FIG. 1 before the incoming data can be written to the memory devices 110. The scrambling process or the encryption process can have an effect of generating data that is near or approximately 50% of binary values 1's and 50% of binary values 0's. The method outlined in this description takes advantage of this ratio of 1's to 0's within pages in the memory devices 110.

The memory controller 104 can include a data generation module 302 to generate encoded data 304. The encoded data 304 are defined as data generated by scrambling or encrypting host data 306 sent from the host system 108. The term "scrambling" or "encrypting" refers to an operation or a technique of manipulating original data to generate random data, which include approximately equal distribution of binary-zero digits and binary-one digits.

The binary-zero digits and the binary-one digits refer to binary values '0' and '1', respectively. The distribution of the binary-one digits (1's) to the binary-zero digits (0's) in the encoded data 304 in each of data pages 310 can be based on a percentage with a predetermined tolerance. The closer a ratio of the binary-one digits (1's) or the binary-zero digits (0's) to a sum of the binary-one digits and the binary-zero digits is to 50%, the more evenly the memory devices 110 would age. For example, the predetermined tolerance can include +/−1% of 1's and +/−1% of 0's. As a specific example, the encoded data 304 in each of the data pages 310 can include the distribution with a ratio of the binary-one digits (1's) or the binary-zero digits (0's) to a sum of the binary-one digits and the binary-zero digits in an approximate range of 49% to 51%.

The encoded data 304 can be presented using a binary numeral system, which is a base-2 number system that represents numerical values using two symbols: 0 and 1. The term "symbols" refers to a number of bits of information or data. For example, the symbols can represent binary values 0 and 1 in a binary (base 2) numeral system or hexadecimal values from "00" to "FF" in a hexadecimal (base 16) numeral system.

The encoded data 304 can include a proportional data distribution 308, which is defined as a pattern with an approximately equal distribution of the symbols. For example, the encoded data 304 can include approximately fifty percents (50%) of the binary-zero digits and approximately fifty percents (50%) of the binary-one digits. The term "approximately equal distribution" refers to a distribution that is within a range of 50% plus/minus a percentage indicated by the predetermined tolerance mentioned above.

The encoded data 304 can be written to a number of the data pages 310 in one of the erase blocks 312 in the memory devices 110. Each of the data pages 310 is defined as a portion of one of the erase blocks 312 that is used to store the encoded data 304. Each of the data pages 310 can include a fixed number of bytes depending on a type of the memory devices 110. Each of the data pages 310 can represent a portion of one of the erase blocks 312 that the memory controller 104 accesses for reading and programming memory cells. For example, the data pages 310 can represent NAND pages.

Each of the erase blocks 312 is defined as a portion of one of the memory devices 110 that the memory controller 104 accesses for erasing memory cells. Each of the erase blocks 312 can include a predetermined size in number of bytes depending on a type of the memory devices 110. The erase blocks 312 can be erased before the data pages 310 are stored or written. The erase blocks 312 can represent storage blocks including a NAND block or any other memory block.

The encoded data 304 stored in the data pages 310 can include a data binary-zero distribution 314 and a data binary-one distribution 316. The data binary-zero distribution 314 is defined as a number of the binary-zero digits. The data binary-one distribution 316 is defined as a number of the binary-one digits. The data binary-zero distribution 314 and the data binary-one distribution 316 represent a total number of the binary-zero digits and the binary-one digits in each of the data pages 310. The data binary-zero distribution 314 can be approximately equal to the data binary-one distribution 316.

Each of the data binary-zero distribution 314 and the data binary-one distribution 316 can be approximately fifty percents (50%). In other words, the data binary-zero distribution 314 and the data binary-one distribution 316 can be 50%+/−a percentage indicated by the predetermined tolerance.

For example, there can be a number of main reasons for scrambling or randomization of the host data 306 to generate and write the encoded data 304 to the memory devices 110. A first reason can be related to even flash wear. Randomization of the host data 306 can cause endurance of all of the erase blocks 312 in the memory devices 110 to be more consistent with respect to a number of program/erase (P/E) cycles. Large groups of the host data 306 or pages that are written and biased to bit values of all 0's can shorten endurance of the erase blocks 312 with respect to pages that are written and biased to bit values of all 1's.

A second reason can be related to bit line program disturbs. Groups of pages within one of the erase blocks 312 with the same data repeated from one page to the next page can cause bit line disturbs in pages that have been previously written. This can manifest itself as a high bit error rate (BER) on the first read after write operations. Additional reads can cause additional bit errors including bit flips in the pages throughout the erase blocks 312.

A third reason can be related to user data encryption. Encryption of the host data 306 to generate the encoded data 304 can be performed for end user data. Encryption processes including Advanced Encryption Standard (AES) encryption or any other encryption process can produce high entropy data. In a statistically weighted tagging approach, an encrypted page can be identified by its high entropy characteristic, allowing tagged blocks to be differentiated from normal data blocks.

The data generation module 302 can be implemented with the control unit 202 of FIG. 2, the storage unit 204 of FIG. 2, the memory interface unit 206 of FIG. 2, the host interface unit 208 of FIG. 2, or a combination thereof. For example, the control unit 202, the storage unit 204, and the memory interface unit 206 can be used for generating the encoded data 304. Also for example, the memory interface unit 206 can be used for writing the encoded data 304 to the memory devices 110. Further for example, the host interface unit 208 can be used for interfacing with the host system 108 to receive the host data 306.

The memory controller 104 can include a block identification module 318 to determine the erase blocks 312 that are marginal or not usable. Once the erase blocks 312 are unusable, the erase blocks 312 can be cataloged or marked in such a way that the erase blocks 312 can be identified. Identifying the erase blocks 312 that are bad or marginal can be performed so that the erase blocks 312 are not used in normal operations. Like factory defect marked blocks, the erase blocks 312 that are marginal can be identifiable via a scan process. This is in case an alternate method for cataloging the erase blocks 312 that are marginal fails.

When the block identification module 318 in the memory sub-system 102 has determined that a marginal instance of the erase blocks 312 is not be used again, the marginal instance can be placed or stored into a persistence list, which identifies which instances of the erase blocks 312 are bad, marginal, or unusable. For example, the persistence list can represent a non-use list.

The persistence list can be stored in a predetermined portion of the memory devices 110. The predetermined portion can be in one of the erase blocks 312. The persistence list can also be stored in a secondary storage device including an on-board memory, such as a Serial Peripheral Interface (SPI) device, a NOR flash device, or an external memory. If the secondary storage device fails, the scan process can be used to find and identify the instances of the erase blocks 312 that are bad or marginal.

Database or information associated with the erase blocks 312 that are marginal can be held or stored in the predetermined portion of the memory devices 110. The database or the information can also be held or stored in the secondary storage device. Since the erase blocks 312 can be identified as marginal during run-time operations, a list of the erase blocks 312 would not be found in an off-drive database, which can usually be generated at manufacturing time.

When one of the erase blocks 312 has been determined to be put or stored into the persistence list, it can be tagged so that it can be identified by the scan process including a software scanning technique. Normal in-use pages either can be in an erased state or can include an amount of data that has been written with a valid error correction code (ECC). With the scrambling process performed on the normal in-use pages, the normal in-use pages can be identifiable.

If valid pages in the erase blocks 312 have lost ECC integrity and have become uncorrectable, the valid pages can still include a ratio of 1's or 0's to a sum of 1's and 0's that matches that of data scrambled using the data scrambling process. The valid pages that are uncorrectable can be marked as unusable or marginal. The valid pages can be tagged with a data pattern with a 1's or 0's ratio of less than 50%. For example, the data pattern can have 25% 1's and 75% 0's. There can be a number of different ways to generate and write a tagged data pattern as described in a subsequent section.

The block identification module 318 identifies marginal blocks 320 when the erase blocks 312 are read from the memory devices 110. Each of the marginal blocks 320 is defined as a portion of one of the memory devices 110 that is unusable. For example, the marginal blocks 320 can represent tagged erase blocks that are marked as unusable.

The marginal blocks 320 can be identified when a number of the data pages 310 are unreliably read from the erase blocks 312 based on a block error 322, which is defined as failure that occurs when expected data is not detected. The block error 322 can be detected by the block identification module 318 based on a number of the failure conditions.

For example, the block error 322 can be detected when a voltage level or a level of charge measured is not correct based on an expected level. During a refresh cycle, the erase blocks 312 can be erased, written with all 0's, and read. If the voltage level is not correct when data is read from the data pages 310 of one of the erase blocks 312, the erase blocks 312 are determined as unreliable and thus identified as the marginal blocks 320.

The block identification module 318 can be implemented with the control unit 202, the storage unit 204, the memory interface unit 206, or a combination thereof. For example, the control unit 202, the storage unit 204, and the memory interface unit 206 can be used for identifying the marginal blocks 320.

The memory controller 104 can include a tag generation module 324 to generate a marginal tag 326 for a number of the marginal blocks 320. The marginal tag 326 can be stored in a number of the data pages 310 in the marginal blocks 320. The marginal tag 326 is defined as information that is used to identify if the data pages 310 are unusable such that the data pages 310 cannot be reliably used for storing the encoded data 304. For example, the marginal tag 326 can represent tag data that indicate if the data pages 310 unusable.

The marginal tag 326 can be generated with a non-proportional data distribution 328 different from the proportional data distribution 308. The non-proportional data distribution 328 is defined as a pattern with an unequal distribution of the binary-zero digits and the binary-one digits. The marginal tag 326 can include less than or greater than, but not equal to, 50% of the binary-zero digits or the binary-one digits. The term "unequal distribution" refers to a distribution that is outside a range of 50% plus/minus a percentage indicated by the predetermined tolerance mentioned above.

The marginal tag 326 can include a tag binary-zero distribution 330 and a tag binary-one distribution 332. The tag binary-zero distribution 330 is defined as a number of the binary-zero digits. The tag binary-one distribution 332 is defined as a number of the binary-one digits. The tag binary-zero distribution 330 and the tag binary-one distribution 332 represent a total number of the binary-zero digits and the binary-one digits in each of the marginal tag 326.

The tag binary-zero distribution 330 can be different from the tag binary-one distribution 332, the data binary-zero distribution 314, and the data binary-one distribution 316. The tag binary-one distribution 332 can be different from the tag binary-zero distribution 330, the data binary-zero distribution 314, and the data binary-one distribution 316. A ratio of the tag binary-one distribution 332 or the tag binary-zero distribution 330 to a sum of the tag binary-one distribution 332 and the tag binary-zero distribution 330 can be any percentage that is not 50%.

For example, the tag binary-zero distribution 330 can include less than 50% of the binary-zero digits and the tag binary-one distribution 332 can include greater than 50% of the binary-one digits. Also for example, a ratio of the tag binary-one distribution 332 or the tag binary-zero distribution 330 to a sum of the tag binary-one distribution 332 and the tag binary-zero distribution 330 can be in an approximate range of greater than 25% and less than 50% or in an approximate range of greater than 50% and less than 75%.

The tag generation module 324 can be implemented with the control unit 202, the storage unit 204, the memory interface unit 206, or a combination thereof. For example, the control unit 202, the storage unit 204, and the memory interface unit 206 can be used for generating the marginal tag 326.

The memory controller 104 can include a code generation module 334 to generate a tag correction code 336, which is defined as redundancy information used to detect or correct a number of symbols. The tag correction code 336 can represent an error correction code (ECC).

The tag correction code 336 can be generated to detect or correct a memory read error when the marginal tag 326 is read from one of the marginal blocks 320. The tag correction code 336 can be generated with a tag correction rate 338 of at least fifty percents. The tag correction rate 338 is defined as a number of the symbols that are correctable over a total number of the symbols of data protected by an error correction code.

At the point where the erase blocks 312 are moved to the persistence list, the erase blocks 312 most likely would be unable to retain correctable data via an error correction code (ECC) method. If the erase blocks 312 have enough endurance left to use an ECC correction factor, the tag correction code 336 for the marginal tag 326 can include an increase in order of magnitude larger than runtime data. The tag correction code 336 can be able to correct every bit in a code word of the marginal tag 326.

The runtime data can have a restriction on how many bytes in a given page that can be used for ECC due to the economics of capacity versus ECC strength. For example, normal data pages can have approximately 5%-10% capacity for ECC. Also for example, ECC methods can include a type of ECC including symbol-based, bit-based, interleaved Reed-Solomon (RS) codes, and Bose-Chaudhuri-Hocquenghem (BHC) codes.

As an example, there can be a correction level of approximately 100 symbols correctable out of 2000 symbols stored because the memory devices 110 can have pages with extra storage erase blocks. For example, the extra storage erase blocks can include 640 bytes for an 8K-byte page with 8192 bytes. This allows a normal operation and use of the memory devices 110 tolerate a bit error rate (BER) that yields an endurance and retention level per capacity that is cost effective. When tagging the marginal blocks 320, there can be no useful user or internal metadata information and therefore no restriction on the efficiency of storage.

The marginal blocks 320 that are tagged can use the tag correction code 336 that allows the tag correction rate 338 of at least 50% based on the type of ECC used. The tag correction rate 338 of at least 50% correction factor can allow at least 1000 symbols of correction out of 2000 symbols. The erase blocks 312 with extremely high BER can be tagged as the marginal blocks 320, which can be recognized and identified far past what would be used for normal host and metadata.

The code generation module 334 can be implemented with the control unit 202, the storage unit 204, the memory interface unit 206, or a combination thereof. For example, the control unit 202, the storage unit 204, and the memory interface unit 206 can be used for generating the tag correction code 336.

The memory controller 104 can include a tag-writing module 340 to write the marginal tag 326 and the tag correction code 336 to a number of tag pages 342. The tag pages 342 are defined as portions in the marginal blocks 320 that are marked as unusable with the marginal tag 326. The tag-writing module 340 can write the marginal tag 326 to the tag pages 342 to mark the tag pages 342 as unusable. The tag pages 342 can be determined as unusable when the marginal tag 326 is read from the tag pages 342. The tag-writing module 340 can write the tag correction code 336 to the tag pages 342 so that the memory read error in the marginal tag 326 could be detected or corrected when the marginal tag 326 is read from the tag pages 342.

As the marginal blocks 320 age, there can be bit flips in the marginal tag 326. However, a weighted ratio of the binary-one digits (1's) or the binary-zero digits (0's) in the marginal tag 326 when the marginal blocks 320 are read can remain relatively the same. In other words, the weighted ratio can remain relatively the same as a ratio of the binary-one digits or the binary-zero digits to a sum of the binary-one digits and the binary-zero digits based on the non-proportional data distribution 328 determined at the time when the marginal tag 326 is first generated and stored with the tag pages 342. The weighted ratio can be outside of an approximate range of 50%+/−the predetermined tolerance. Bit flipping refers to a binary digit '0' or a binary digit "1" unintentionally reversed to 1 or 0, respectively. For example, bit flipping can be a result of drifting effects, program-disturb errors, or read-disturb errors.

The marginal tag 326 can be written to the tag pages 342 in the marginal blocks 320. Locations of the tag pages 342 can be predetermined in the marginal blocks 320. The tag pages 342 can be written to a number of first pages 344. The first pages 344 are defined as portions of the marginal blocks 320 that are at the beginning of the marginal blocks 320 based on physical addresses of the memory devices 110.

The tag pages 342 can include at least 50% capacity of storage space for the tag correction code 336. For example, the tag pages 342 can include approximately 50% capacity for the marginal tag 326 and approximately 50% capacity for the tag correction code 336.

The tag pages 342 can be written to fast pages 346 in the marginal blocks 320 of the memory devices 110. The fast pages 346 are defined as portions of the marginal blocks 320 that have less time to program compared to slow pages 348. The fast pages 346 can function similarly to single-level cell (SLC) mode pages.

The term "fast" and "slow" refer to a fast bit and a slow bit, respectively, of a memory cell in the memory devices 110. A number of the fast bit and a number of the slow bit make up the fast pages 346 and the slow pages 348, respectively. The fast bit and the slow bit provide four possible states for the memory cell with each state determined by a threshold voltage that represents an amount of the charges stored inside a floating gate of the memory devices 110.

The fast pages 346 can be programmed in a time that is at least four times less than that of the slow pages 348. Thus, the fast pages 346 can be programmed with less power than that for the slow pages 348. For example, the fast pages 346 and the slow pages 348 can represent least-significant bit (LSB) pages and most-significant bit (MSB) pages, respectively, in the MLC flash memories. Also for example, by taking advantage of characteristics of MLC NAND devices, there can be an increase in a number of the tag pages 342 since the MLC NAND devices have larger block sizes for the erase blocks 312 and thus more pages to write compare to SLC NAND devices.

Even after a retention period, the marginal tag 326 in the tag pages 342 of the marginal blocks 320 can be distinctly different from a normal valid data page, an erased page, or a factory defect marked page. Additional steps can be used to increase data retention of the erase blocks 312 that are marked as the marginal blocks 320.

The tag pages 342 of the marginal blocks 320 that cannot be reliably read or determined as tagged pages can be determined as completely failed pages. In this case, the tag pages 342 can include all 0's or all 1's digits as background data values.

In the memory devices 110 with an MLC structure, a set of pages within one of the marginal blocks 320 can be used as those with an SLC structure by not using sibling pages, which share the same memory cell as the set of the pages. The set of the pages and the sibling pages can represent the fast pages 346 and the slow pages 348, respectively. The set of the pages can also represent primary or least significant bit (LSB) pages that can be used to store the marginal tag 326 as tagging information resulting in increased retention if the sibling pages are not written.

Another method or technique can include changing programming characteristics of the tag pages 342. The programming characteristics can be changed via test modes. The programming characteristics can be changed so that the tag pages 342 can have high retention properties. The method of changing the programming characteristics coupled together with the use of only the fast pages 346 can be used only for tagging the erase blocks 312 as the marginal blocks 320. The marginal blocks 320 can be tagged with this technique to extend the useful life of the marginal blocks 320 by sacrificing or reducing half (½) of the capacity of the marginal blocks 320.

The memory controller 104 can include a tag correction module 350 to detect or correct a tag correctable error 352, which is defined as the memory read error that occurs when a number of the symbols are incorrect. The tag correctable error 352 in the marginal blocks 320 can be detected and corrected with the tag correction code 336 when the tag pages 342 are read from the marginal blocks 320.

The tag correction module 350 can be implemented with the control unit 202, the storage unit 204, the memory interface unit 206, or a combination thereof. For example, the control unit 202, the storage unit 204, and the memory interface unit 206 can be used for correcting the tag correctable error 352 in the marginal blocks 320.

The memory controller 104 can include a tag detection module 354 to generate a read tag 356. The read tag 356 is defined as a numerical value that is used to determine whether the tag pages 342 are unusable when the tag pages 342 are read. The read tag 356 can be generated based on the marginal tag 326, the tag correction code 336, or a combination thereof.

The read tag 356 can include a read binary-zero distribution 358 and a read binary-one distribution 360. The read binary-zero distribution 358 is defined as a number of the binary-zero digits. The read binary-one distribution 360 is defined as a number of the binary-one digits. The read binary-zero distribution 358 and the read binary-one distribution 360 represent a total number of the binary-zero digits and the binary-one digits associated with each of the tag pages 342.

The read tag 356 can be generated based on the marginal tag 326. The read tag 356 can be assigned with a numerical value read from one of the tag pages 342. As an example, the tag detection module 354 can determine that the one of the tag pages 342 is unusable when the read tag 356 includes a ratio of the read binary-one distribution 360 or the read binary-zero distribution 358 to a sum of the read binary-one distribution 360 and the read binary-zero distribution 358 not equal to approximately 50%. As a specific example, the ratio is less than 50% minus the predetermined tolerance or greater than 50% plus the predetermined tolerance. As such, the ratio indicates that the one of the tag pages 342 is unusable and is different from the data pages 310 that have valid data.

Detection of the marginal blocks 320 that are tagged as unusable can optionally not rely on an actual numerical value of the marginal tag 326 read from the tag pages 342. The detection can also optionally not rely on an error correction code (ECC) correctable value with the tag correction code 336 when the tag pages 342 are read from the marginal blocks 320. Instead, the detection can be based on a statistical distribution of the read binary-one distribution 360 to the read binary-zero distribution 358 to determine a difference between the marginal blocks 320 that are tagged as unusable and the data pages 310 that have valid data but have become uncorrectable due to varying wear or failure problems.

Detection of the marginal blocks 320 can optionally not rely on the actual numerical value of the marginal tag 326. This is because the marginal tag 326 in the tag pages 342 can vary over time and thus does not retain a numerical value of the marginal tag 326 determined when the marginal tag 326 is initially generated and written to the tag pages 342. However, the memory controller 104 can include data retention capability that retains the marginal tag 326 having the non-proportional data distribution 328. As such, the read tag 356 can include the non-proportional data distribution 328.

For example, the read tag 356 can retain the non-proportional data distribution 328 at a gross or overall level in an approximate range of 25% to 75%, but not 50%, for a ratio of the binary-one digits (1's) or the binary-zero digits (0's) to a sum of the binary-one digits and the binary-zero digits. Also for example, when the data pages 310, the tag pages 342, or a combination thereof completely fail, numerical values in the data pages 310, the tag pages 342, or a combination thereof can include entirely the binary-zero digits (0's) or entirely the binary-one digits (1's). These numerical values can represent background data value.

Detection of the marginal blocks 320 can optionally be based on the marginal tag 326 and the tag correction code 336 when the tag pages 342 are read from the marginal blocks 320. After the tag correction module 350 detects the tag correctable error 352, the tag detection module 354 can assign the read tag 356 to the marginal tag 326 that has been corrected with the tag correction code 336.

The read tag 356 can indicate that the tag pages 342 are unusable based on a ratio of the read binary-one distribution 360 to the read binary-zero distribution 358. When the ratio is approximately the same as a ratio of the tag binary-one distribution 332 to the tag binary-zero distribution 330 determined when the marginal tag 326 is initially generated and written to the tag pages 342, the tag pages 342 are determined as unusable. Even though these ratios are the same, the read binary-zero distribution 358 and the read binary-one distribution 360 can be different from the tag binary-zero distribution 330 and the tag binary-one distribution 332, respectively, since the marginal tag 326 can vary over time.

The tag detection module 354 can be implemented with the control unit 202, the storage unit 204, the memory interface unit 206, or a combination thereof. For example, the control unit 202, the storage unit 204, and the memory interface unit 206 can be used to generate the read tag 356 and compare a ratio of the read binary-one distribution 360 to the read binary-zero distribution 358 to a ratio of the tag binary-one distribution 332 to the tag binary-zero distribution 330.

The modules described above can be implemented in hardware as a hardware accelerator within the control unit 202 or as a hardware implementation in the storage control system 100 of FIG. 1 outside of the control unit 202.

It has been discovered that the encoded data 304 having the proportional data distribution 308 provides improved maintenance capability of the storage control system 100 since the encoded data 304 includes approximately 50% of the binary-zero digits and approximately 50% of the binary-one digits thereby allowing the marginal blocks 320 to be identifiable.

It has also been discovered that the marginal blocks 320 identified based on the block error 322 provides improved reliability of the storage control system 100 since the erase blocks 312 that are degrading and thus unusable are not used to store the encoded data 304 in normal operations.

It has further been discovered that the marginal tag 326 having the non-proportional data distribution 328 different from the proportional data distribution 308 provides ease of maintenance in the storage control system 100 because the non-proportional data distribution 328 allows the marginal blocks 320 to be tagged directly and identifiable without relying on the secondary storage device.

It has further been discovered that the tag correction code 336 provides improved reliability of the storage control system 100 since the tag correction code 336 provides the tag correction rate 338 of at least fifty percents to correct the tag correctable error 352 when the tag pages 342 are read from the marginal blocks 320.

It has further been discovered that the tag pages 342 written to the first pages 344 and the fast pages 346 provide improved read reliability for the marginal tag 326 since the first pages 344 and the fast pages 346 are programmed with less time and thus less power than that for the slow pages 348. The tag pages 342 written to the first pages 344 and the fast pages 346 have high retention. The first pages 344 and the fast pages 346 function more like single-level cell (SLC) pages since their connected sibling pages, which shared the same field-effect transistor (FET) storage device, are not written and there are only two voltage levels, instead of four voltage levels, to differentiate. This will result in the tag pages 342 having tag values with greater retention capability than other tag values that are not stored in the first pages 344 and the fast pages 346.

It has further been discovered that the read tag 356 provides reliable detection of the marginal tag 326. The read tag 356 having a ratio of the read binary-one distribution 360 to the read binary-zero distribution 358 approximately the same as a ratio of the tag binary-one distribution 332 to the tag binary-zero distribution 330 allows the tag pages 342 to be reliably identified as unusable.

It has further been discovered that even though the read binary-zero distribution 358 and the read binary-one distribution 360 are different from the tag binary-zero distribution 330 and the tag binary-one distribution 332, respectively, the read tag 356 still provides reliable detection of the marginal tag 326. The reliable detection is provided because the read tag 356 includes the non-proportional data distribution 328 with a ratio of the read binary-one distribution 360 to the read binary-zero distribution 358 greater than 25% and less than 50% minus the predetermined tolerance or greater than 50% plus the predetermined tolerance and less than 75%.

Referring now to FIG. 4, therein is shown an exemplary diagram of a portion of one of the data pages 310. The exemplary diagram depicts the encoded data 304 with a distribution of approximately 50% of the binary-zero digits and approximately 50% of the binary-one digits. The encoded data 304 are shown with a random location distribution of the binary-zero digits and the binary-one digits in the one of the data pages 310.

The data pages 310 can be identifiable as a normal data page with the encoded data 304. The encoded data 304 can be associated with the host data 306 of FIG. 3. The data pages 310 can include the encoded data 304 stored with a data error correction code (ECC) for detecting and/or correcting an ECC error. The data pages 310 can be identifiable from a correctable nature of the encoded data 304 having been stored with the data ECC.

Referring now to FIG. 5, therein is shown a first exemplary diagram of the marginal tag 326 for a portion of the marginal blocks 320 of FIG. 3. The first exemplary diagram depicts a method for marginal tagging. The first exemplary diagram depicts the marginal tag 326 in hexadecimal values.

The first exemplary diagram depicts the marginal tag 326 for the data pages 310 of FIG. 3 of the erase blocks 312 of FIG. 3 that have been identified as the marginal blocks 320. The first exemplary diagram depicts the marginal tag 326 with a distribution of approximately twenty-five percents (25%) of the binary-one digits and approximately seventy-five percents (75%) of the binary-zero digits.

The tag generation module 324 of FIG. 3 can generate the marginal tag 326 having a lump pattern 502. The lump pattern 502 is defined as a sequence of contiguous binary-zero digits 504 and contiguous binary-one digits 506. For example, the lump pattern 502 can represent a lumped marking type of a page.

The contiguous binary-zero digits 504 are defined as the binary-zero digits that are grouped together having the same binary value '0' in one location. The contiguous binary-one digits 506 are defined as the binary-one digits that are grouped together having the same binary value '1' in another location. The contiguous binary-zero digits 504 and the contiguous binary-one digits 506 can represent 75% of the binary-zero digits and 25% of the binary-one digits, respectively.

The lump pattern 502 can include the tag binary-zero distribution 330 with the contiguous binary-zero digits 504 and the tag binary-one distribution 332 with the contiguous binary-one digits 506. The tag binary-zero distribution 330 can be different from the tag binary-one distribution 332, the data binary-zero distribution 314 of FIG. 3, and the data binary-one distribution 316 of FIG. 3. The tag binary-one distribution 332 can be different from the tag binary-zero distribution 330, the data binary-zero distribution 314, and the data binary-one distribution 316.

The encoded data 304 of FIG. 3 and the marginal tag 326 have been described using the data binary-zero distribution 314, the data binary-one distribution 316, the tag binary-zero distribution 330, and the tag binary-one distribution 332, although it is understood that the encoded data 304 and the marginal tag 326 can be represented using any numeral system or any base. For example, the encoded data 304 and the marginal tag 326 can be represented by a hexadecimal (base 16) numeral system.

The lump pattern 502 having the contiguous binary-zero digits 504 and the contiguous binary-one digits 506 can be written to the tag pages 342 by the tag-writing module 340 of FIG. 3. The lump pattern 502 can be written to the tag pages 342 to mark the tag pages 342 as unusable.

The lump pattern 502 can include the contiguous binary-zero digits 504 immediately followed by the contiguous binary-one digits 506 or the contiguous binary-one digits 506 immediately followed by the contiguous binary-zero digits 504. For example, the first exemplary diagram depicts the contiguous binary-one digits 506 with 25% of the binary-one digits immediately followed by the contiguous binary-zero digits 504 with 75% of the binary-zero digits.

It has been discovered that the tag pages 342 identified with the lump pattern 502 provides improved quality since the lump pattern 502 reliably indicates that the marginal blocks 320 are unusable. The marginal blocks 320 are reliably indicated as unusable because the lump pattern 502 includes the contiguous binary-zero digits 504 and the contiguous binary-one digits 506 that are unique and thus different from the encoded data 304.

Figure 6:
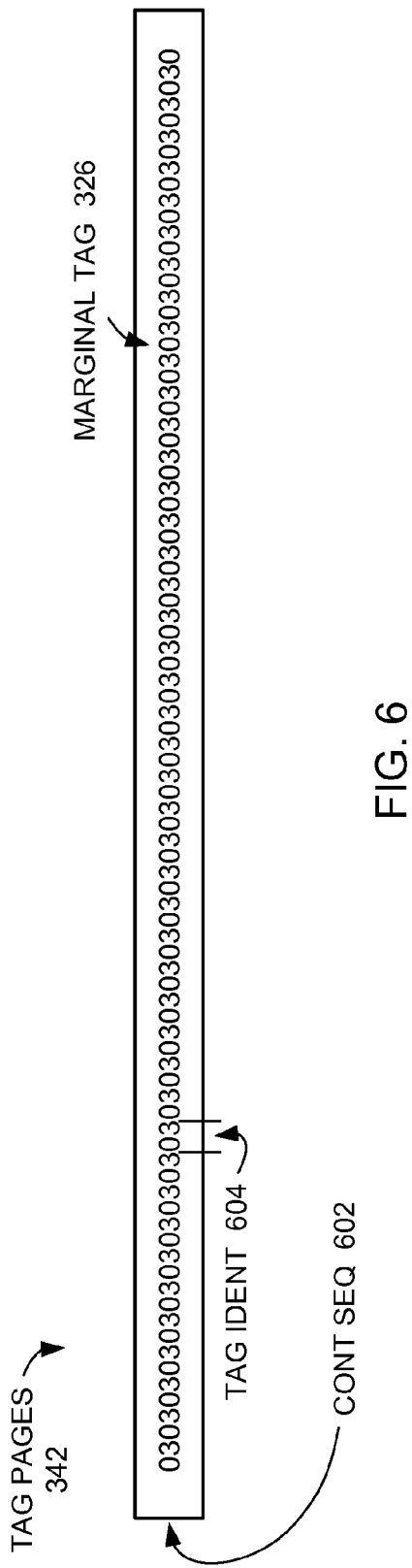
FIG. 6 is a second exemplary diagram of the marginal tag for a portion of the marginal blocks of FIG. 3.

Referring now to FIG. 6, therein is shown a second exemplary diagram of the marginal tag 326 for a portion of the marginal blocks 320 of FIG. 3. The second exemplary diagram depicts another method for marginal tagging. The second exemplary diagram depicts the marginal tag 326 in hexadecimal values.

The second exemplary diagram depicts the marginal tag 326 for the data pages 310 of FIG. 3 of the erase blocks 312 of FIG. 3 that have been identified as the marginal blocks 320. The second exemplary diagram depicts the marginal tag 326 with a distribution of approximately twenty-five percents (25%) of the binary-one digits and approximately seventy-five percents (75%) of the binary-zero digits.

The tag generation module 324 of FIG. 3 can generate a contiguous sequence 602 of one of tag identifiers 604 for the marginal tag 326. The contiguous sequence 602 is defined as a repetitive pattern of a number of the binary-zero digits, a number of the binary-one digits, or a combination thereof. The tag identifiers 604 are defined as information that identify why the erase blocks 312 are determined as the marginal blocks 320.

The marginal tag 326 can be generated with the contiguous sequence 602 of a number of one of the tag identifiers 604. The marginal tag 326 can be generated with a repetition of only one of the tag identifiers 604. Each of the tag identifiers 604 can include a unique tag value such that the tag identifiers 604 are different from each other. The tag identifiers 604 can be used to indicate a reason why the erase blocks 312 are determined as the marginal blocks 320. The tag identifiers 604 can include a number of predetermined hexadecimal values to identify a number of the failure conditions.

The second exemplary diagram depicts one of the tag identifiers 604 with a hexadecimal value of "03". For illustrative purposes, the one of the tag identifiers 604 is shown as a byte, although it is understood that each of the tag identifiers 604 can include any number of bytes.

The contiguous sequence 602 of the tag identifiers 604 can be written to the tag pages 342 by the tag-writing module 340 of FIG. 3. The contiguous sequence 602 of the tag identifiers 604 can be written to the tag pages 342 to mark the tag pages 342 as unusable as well as to identify the failure conditions indicating the reason why the tag pages 342 are unusable.

The second exemplary diagram depicts the marginal tag 326 having approximately 25% of the binary-one digits (1's) evenly distributed throughout an entirety of the tag pages 342 in the marginal blocks 320. This has an advantage over the lump pattern 502 of FIG. 5 because the tag identifiers 604 provide a number of different tag values. The different tag values with different patterns can be used to identify why the erase blocks 312 are retired and marked as the marginal blocks 320.

The tag-writing module 340 can be implemented with the control unit 202 of FIG. 2, the storage unit 204 of FIG. 2, the memory interface unit 206 of FIG. 2, or a combination thereof. For example, the control unit 202, the storage unit 204, and the memory interface unit 206 can be used for writing the tag identifiers 604 to the tag pages 342.

It has been discovered that the tag pages 342 identified with the contiguous sequence 602 of a number of the tag identifiers 604 provide improved quality since the tag identifiers 604 indicate not only the marginal blocks 320 are unusable but also why the erase blocks 312 are retired and marked as the marginal blocks 320.

Figure 7:
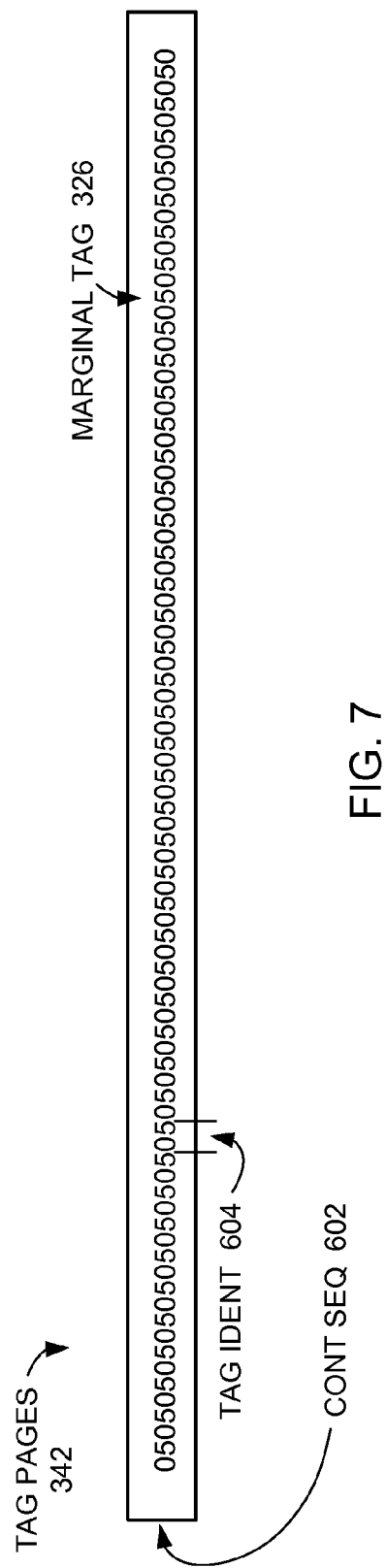
FIG. 7 is a third exemplary diagram of the marginal tag for a portion of the marginal blocks of FIG. 3.

Referring now to FIG. 7, therein is shown a third exemplary diagram of the marginal tag 326 for a portion of the marginal blocks 320 of FIG. 3. The third exemplary diagram depicts yet another method for marginal tagging. The third exemplary diagram depicts the marginal tag 326 in hexadecimal values.

The third exemplary diagram depicts the marginal tag 326 for the data pages 310 of FIG. 3 of the erase blocks 312 of FIG. 3 that have been identified as the marginal blocks 320. The third exemplary diagram depicts the marginal tag 326 with a distribution of approximately twenty-five percents (25%) of the binary-one digits and approximately seventy-five percents (75%) of the binary-zero digits.

The tag generation module 324 of FIG. 3 can generate the marginal tag 326 having the contiguous sequence 602 of one of the tag identifiers 604 for the tag pages 342. The third exemplary diagram depicts one of the tag identifiers 604 with a hexadecimal value of "05".

The storage control system 100 of FIG. 1 describes the module functions or order as an example. The modules can be partitioned differently. Each of the modules can operate individually and independently of other modules. For example, the block identification module 318 of FIG. 3 and the tag generation module 324 can be implemented in a single module instead of two separate modules.

Figure 8:
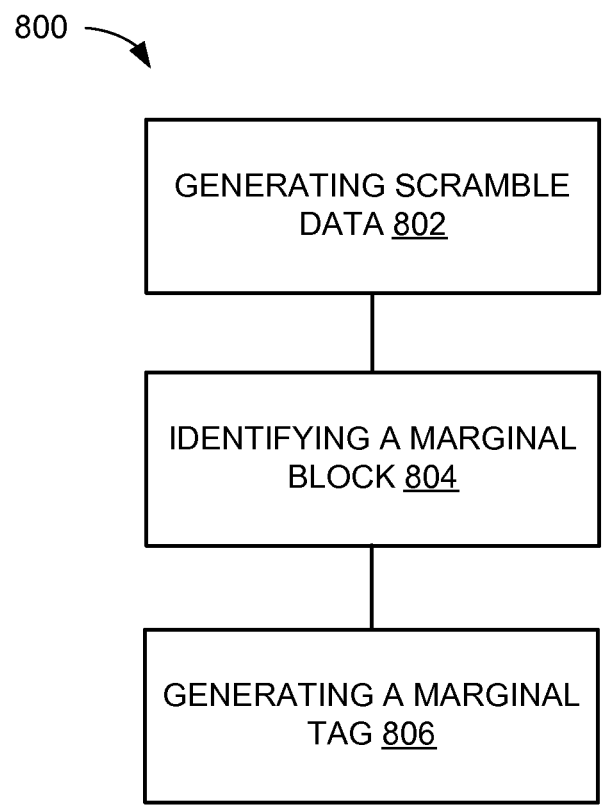
FIG. 8 is a flow chart of a method of operation of the storage control system in a further embodiment of the present invention.

Referring now to FIG. 8, therein is shown a flow chart of a method 800 of operation of the storage control system 100 in a further embodiment of the present invention. The method 800 includes: generating encoded data having a proportional data distribution for writing to a memory device in a block 802; identifying a marginal block when an erase block is read from the memory device in a block 804; and generating a marginal tag for the marginal block, the marginal tag having a non-proportional data distribution different from the proportional data distribution in a block 806.

Thus, it has been discovered that the storage control system of the present invention furnishes important and heretofore unknown and unavailable solutions, capabilities, and functional aspects for a storage control system with data management mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a storage control system comprising:
    generating encoded data having a proportional data distribution for writing to a memory device;
    identifying a marginal block when an erase block is read from the memory device;
    generating a marginal tag for the marginal block, the marginal tag having a non-proportional data distribution different from the proportional data distribution;
    storing the marginal tag in data pages of the marginal block; and
    upon reading a data page in which the marginal tag has been stored, detecting that the data page has a non-proportional data distribution different from the proportional data distribution, and detecting that the data page is unusable and located in the marginal block in accordance with said detection of the non-proportional data distribution.

2. The method as claimed in claim 1 wherein:
    generating the encoded data includes generating the encoded data having a data binary-zero distribution; and
    generating the marginal tag includes generating the marginal tag having a tag binary-zero distribution different from the data binary-zero distribution.

3. The method as claimed in claim 1 wherein
storing the marginal tag includes storing the marginal tag in one or more data pages determined to be uncorrectable pages of the erase block.

4. The method as claimed in claim 1 further comprising:
generating a tag identifier for the marginal tag; and
writing the tag identifier to a tag page in the marginal block.

5. The method as claimed in claim 1 further comprising:
generating a tag correction code for the marginal block; and
correcting a tag correctable error in the marginal block with the tag correction code.

6. A method of operation of a storage control system comprising:
generating encoded data having a proportional data distribution for writing to a memory device;
identifying a marginal block based on a block error when an erase block is read from the memory device;
generating a marginal tag for the marginal block, the marginal tag having a non-proportional data distribution different from the proportional data distribution;
storing the marginal tag in data pages of the marginal block; and
upon reading a data page in which the marginal tag has been stored, detecting that the data page has a non-proportional data distribution different from the proportional data distribution, and detecting that the data page is unusable and located in the marginal block in accordance with said detection of the non-proportional data distribution.

7. The method as claimed in claim 6 wherein:
generating the encoded data includes generating the encoded data having a data binary-zero distribution; and
generating the marginal tag includes generating the marginal tag having a tag binary-zero distribution and a tag binary-one distribution, the tag binary-zero distribution different from the data binary-zero distribution; and
further comprising:
generating a read tag having a read binary-zero distribution and a read binary-one distribution, the read binary-zero distribution different from the tag binary-zero distribution, the read binary-one distribution different from the tag binary-one distribution.

8. The method as claimed in claim 6 wherein:
generating the encoded data includes generating the encoded data having a data binary-one distribution; and
generating the marginal tag includes generating the marginal tag having a lump pattern with a tag binary-one distribution different from the data binary-one distribution, the lump pattern having contiguous binary-zero digits and contiguous binary-one digits.

9. The method as claimed in claim 6 further comprising:
generating a contiguous sequence of a tag identifier for the marginal tag; and
writing the contiguous sequence of the tag identifier to a tag page in the marginal block.

10. The method as claimed in claim 6 further comprising:
generating a tag correction code with a tag correction rate of at least fifty percent for the marginal block; and
correcting a tag correctable error in the marginal block with the tag correction code.

11. A storage control system comprising:
a data generation module for generating encoded data having a proportional data distribution for writing to a memory device;
a block identification module for identifying a marginal block when an erase block is read from the memory device;
a tag generation module for;
generating a marginal tag for the marginal block, the marginal tag having a non-proportional data distribution different from the proportional data distribution;
storing the marginal tag in data pages of the marginal block; and
a tag detection module for detecting, after the storage control system reads a data page in which the marginal tag has been stored, that the data page has a non-proportional data distribution different from the proportional data distribution, and detecting that the data page is unusable and located in the marginal block in accordance with said detection of the non-proportional data distribution.

12. The system as claimed in claim 11 wherein:
the data generation module is for generating the encoded data having a data binary-zero distribution; and
the tag generation module is for generating the marginal tag having a tag binary-zero distribution different from the data binary-zero distribution.

13. The system as claimed in claim 11 wherein:
the data generation module is for generating the encoded data having a data binary-one distribution; and
the tag generation module is for generating the marginal tag having a lump pattern with a tag binary-one distribution different from the data binary-one distribution.

14. The system as claimed in claim 11 wherein:
the tag generation module is for generating a tag identifier for the marginal tag; and
further comprising:
a tag-writing module for writing the tag identifier to a tag page in the marginal block.

15. The system as claimed in claim 11 further comprising:
a code generation module for generating a tag correction code for the marginal block; and
a tag correction module for correcting a tag correctable error in the marginal block with the tag correction code.

16. The system as claimed in claim 11 wherein the block identification module is for identifying the marginal block based on a block error when the erase block is read from the memory device.

17. The system as claimed in claim 16 wherein:
the data generation module is for generating the encoded data having a data binary-zero distribution; and
the tag generation module is for generating the marginal tag having a tag binary-zero distribution and a tag binary-one distribution, the tag binary-zero distribution different from the tag binary-one distribution and the data binary-zero distribution; and
further comprising:
a tag detection module for generating a read tag having a read binary-zero distribution and a read binary-one distribution, the read binary-zero distribution different from the tag binary-zero distribution, the read binary-one distribution different from the tag binary-one distribution.

18. The system as claimed in claim 16 wherein:
the data generation module is for generating the encoded data having a data binary-one distribution; and
the tag generation module is for generating the marginal tag having a lump pattern with a tag binary-one distribution different from the data binary-one distribution, the lump pattern having contiguous binary-zero digits and contiguous binary-one digits.

19. The system as claimed in claim 16 wherein:
the tag generation module is for generating a contiguous sequence of a tag identifier for the marginal tag; and
further comprising:
   a tag-writing module for writing the contiguous sequence of the tag identifier to a tag page in the marginal block.
20. The system as claimed in claim 16 further comprising:
a code generation module for generating a tag correction code with a tag correction rate of at least fifty percent for the marginal block; and
a tag correction module for correcting a tag correctable error in the marginal block with the tag correction code.

\* \* \* \* \*